7344X
D. FLAGG, Jr. & A. PARKER.
BRICK MACHINE.
Patented Dec. 28, 1832.
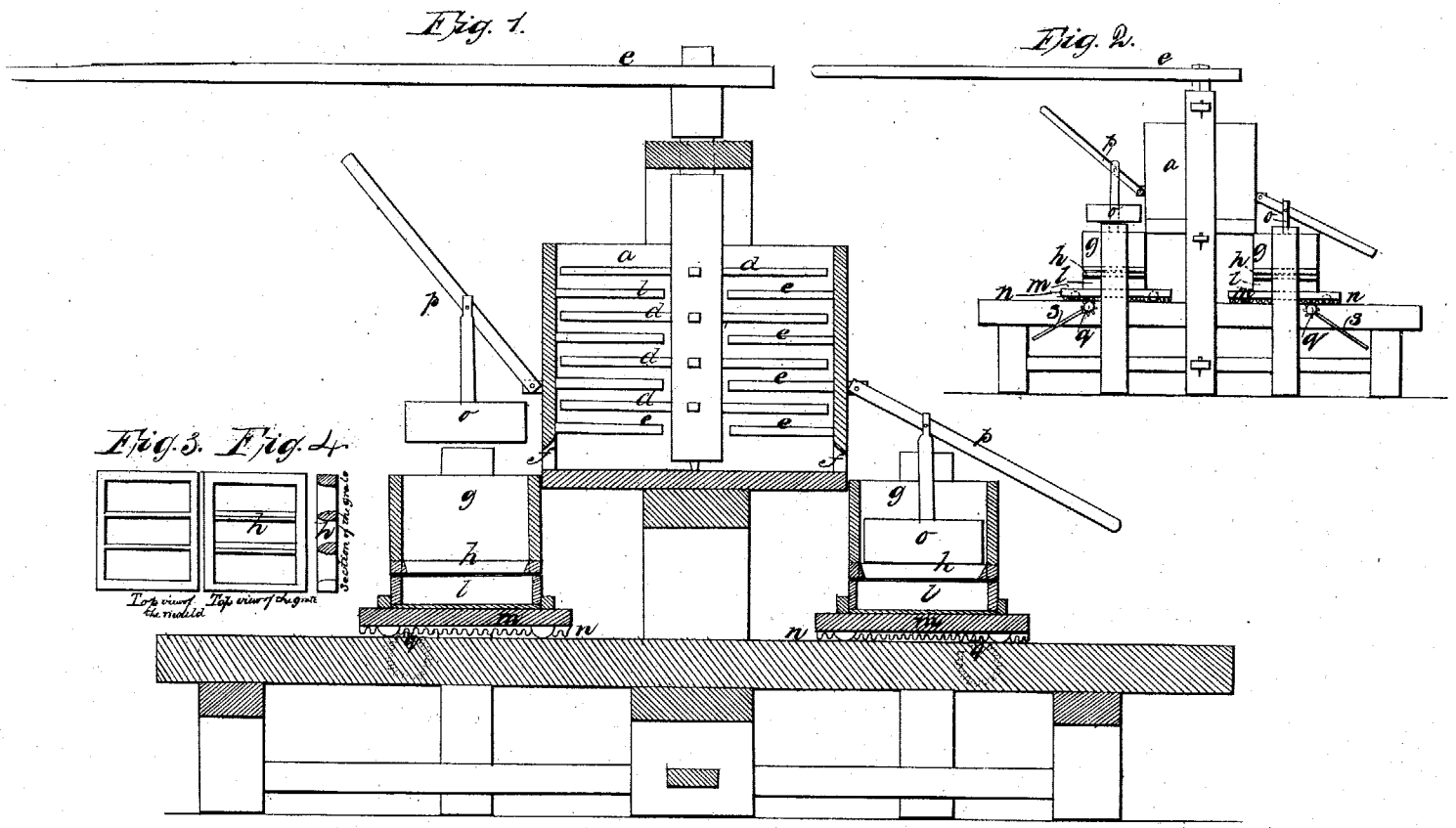
THE NORRIS PETERS CO., PHOTO-LITHO., WASHINGTON, D. C.

7344x Dec 28, 1832

David Flagg Junr. and Amos Parker.

Letters Patent.

The Schedule referred to in these Letters Patent and making part of the same, containing a description in the words of the said David Flagg Junr. and Amos Parker themselves of their improvement in a Machine for manufacturing Stock, brick, tile &c. ——

To All Men To Whom These Presents Shall Come.

David Flagg Junr. of the City, County and State of New York. & Amos Parker of the town of Sweden in the County of Oxford in the State of Maine send greeting: Be it known that we the said David Flagg Junr. & Amos Parker have invented, constructed, and applied to use, a new and useful improvement in the manufacturing of Stock brick tile &c; at one opperation by pressure; called Flagg's & Parker's improved double moulding Machine for moulding Stock brick, tile &c; which improvement and manner of use is as follows, (to wit) a suitable frame is constructed to receive the moulding apparatus and Machinery, on this frame is placed the tub or box in which the clay is tempered, this tub or box may be made of plank or other suitable materials, three feet in diameter and two and a half feet deep more or less— in the centre of this tub or box is placed a perpendicular shaft supported at the top with a piece of timber running across the tub or box with the said shaft passing loosely through the same. to the shaft is affixed a sweep or lever to which the power is applied to put the said Machine in motion to temper the clay. this shaft has spokes or arms projecting from it so as to come nearly in contact with the inside of the tub, the tub has also spokes which intersect those in the shaft, by these passing between each other the clay is tempered fit for moulding. when tempered it passes out on two sides of the tub or box near the bottom (spaces being left for that purpose, into the chambers from which it is pressed into the moulds which form the brick. these chambers are boxes twelve inches deep & of such length & width as to as to suit the grate or fixture, according to the number and size
of the brick which the mould may contain, this grate or fixture
forms the bottom of the chambers, & is made in the following manner
(to wit) of hard wood or other suitable materials, this grate is made
somewhat in the form of the Mould, each space being one inch less in
length & breadth than the mould in which the brick are formed. The bars
which form the grate are two and a half inches in width by three inches in
depth, being bevelled on each side & forming a sharp edge at the top so as to
contract the mortar when passing through to its proper length & breadth
to form the brick- at the top of the chambers are followers or festions
which enter them loosely- by which the mortar is forced through
the grate or fixture into the mould which forms the brick; under
these grates or fixtures is a carriage which moves backward and
forward by means of a cogwheel and lever which gear into a
fixed rack on the under side of the carriage to convey the mould to its
proper place to receive the clay or mortar which forms the brick
[pistons]
through the grates. These followers or festions are also moved by
a cogwheel or lever forcing the mortar from the chambers through
the grates, forming the brick- the mould is then drawn out of the
machine by said lever attached to said carriage & by which means
[pistons]
the said followers or festions are thrown up to their former place,
leaving the chambers open to receive a further supply of mortar.
the mould is made to contain three bricks more or less of smooth
wood- the edges of which are raised to nearly a sharp edge with iron
or any other suitable materials, the bottom of said mould may be
either made fast or not as may be thought most convenient to the
moulder, The Machine being complete and the Mortar tempered
ready for moulding, the mould is made moist so as the dust
or sand will adhere to it, it is then placed on the carriage, forced
into its proper place, under said grate, ready to receive the mortar
which form the brick- the lever attached to the followers or festions
is then forced down by which the mortar is forced from the
chambers through the grate into the mould which forms the brick the 7344x Dec 28, 1832 the mould is then removed by means of said lever & carriage out of the machinery. it is then taken by the hands of the moulder to a block & struck with considerable force on the same, and it is then struck off level with the top of the said mould, the board on which the bricks are to be laid is then placed on the top of the mould, the mould is then turned upside down, holding the board firmly to the same, the mould is then drawn from the bricks, having the brick on said [illegible] the board is then taken to a suitable place where the bricks are to remain until dry. What we claim as our invention and improvement is the manufacturing of stock brick tile &c. by pressure at one opperation as herein before specified. Witness our hands this fourth day of October A D 1831.

Witnesses
Wm Tolley
Jeremiah Kilderhouse

David Flagg Junr
Amos Parker (1036 words) Patented 28 December 1832